United States Patent [19]

Jensen

[11] 4,325,722
[45] Apr. 20, 1982

[54] BUSHING ENVIRONMENT CONTROL ASSEMBLY

[75] Inventor: Thomas H. Jensen, Murrysville, Pa.

[73] Assignee: PPG Industries, Inc., Pittsburgh, Pa.

[21] Appl. No.: 223,525

[22] Filed: Jan. 8, 1981

[51] Int. Cl.³ .......................................... C03B 37/025
[52] U.S. Cl. ........................................ 65/12; 65/11.1; 65/2
[58] Field of Search ............................... 65/2, 11.1, 12

[56] References Cited

U.S. PATENT DOCUMENTS

| | | | |
|---|---|---|---|
| 3,304,163 | 2/1967 | Holschlag | 65/12 X |
| 3,374,074 | 3/1968 | Russell et al. | 65/2 |
| 3,969,099 | 7/1976 | Reese | 65/2 |
| 4,018,586 | 4/1977 | Cates, Jr. et al. | 65/2 |
| 4,049,411 | 9/1977 | Long et al. | 65/2 |
| 4,049,415 | 9/1977 | Dent, Jr. | 65/11 |
| 4,088,469 | 5/1978 | Schaefer | 65/5 |

Primary Examiner—Robert L. Lindsay, Jr.
Attorney, Agent, or Firm—John E. Curley

[57] ABSTRACT

A bushing environment control assembly for use with a glass fiber filament forming device is disclosed. The assembly controls the environment in the attenuation zone immediately below the glass fiber forming bushing's tip plate, the area in which the molten glass is attenuated and formed into filaments. A fin cooler assembly is secured beneath the tip plate and is provided with both liquid and gaseous coolant mediums. The coolant gas is directed into the zone adjacent the fiber forming tips from a plenum chamber in the fin cooler assembly. Additional coolant gas is directed downwardly parallel to the attenuated strands. The fins of the fin cooler are also adjustable with respect to the tip plate.

9 Claims, 3 Drawing Figures

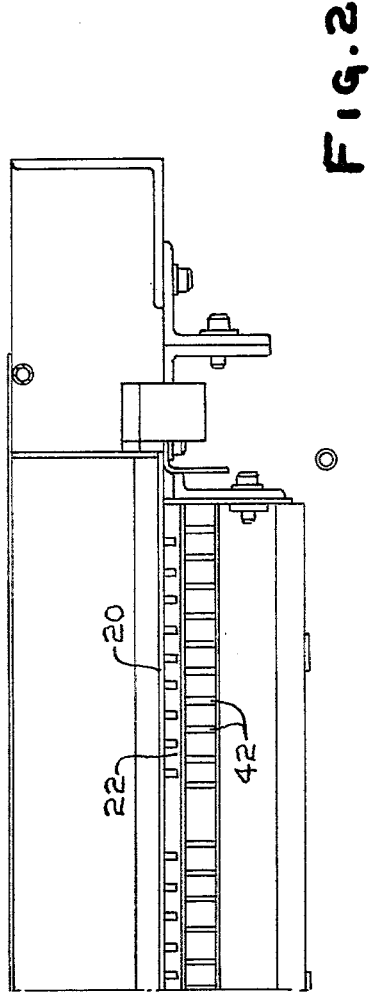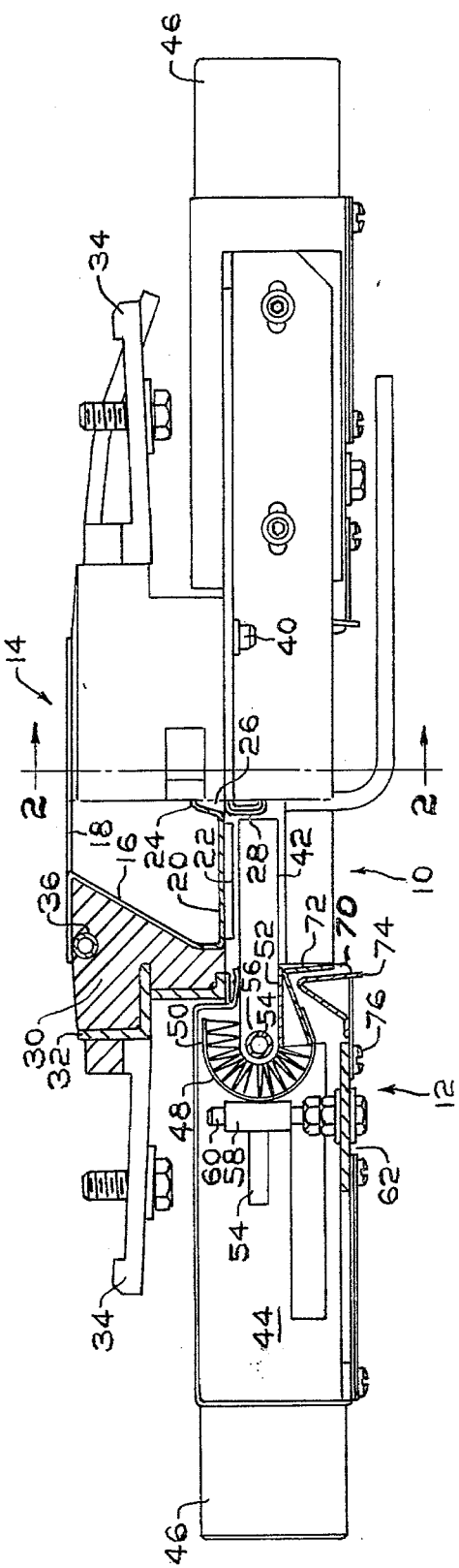

BUSHING ENVIRONMENT CONTROL ASSEMBLY

FIELD OF THE INVENTION

The present invention is directed generally to a bushing environment control assembly for use withh a glass fiber forming apparatus. More particularly the present invention is directed to a bushing environment control assembly which is incorporated with a bushing fin cooler. Most specifically, the subject invention is directed to a bushing environment control assembly wherein a gaseous coolant is supplied to the zone adjacent and just below the tip plate area of the bushing. This coolant gas, which may be air or another gas, is supplied to a plenum chamber portion of the fin cooler assembly. The gas is supplied under pressure and passes through diffuser screens to flow into the region of the bushing just below the tip plate. Since this is the zone in which the molten glass is attenuated and formed into filaments, control of the environment in this region aids in the formation of the filaments. The fin plates of the fin cooler are pivotally carried so that their position with respect to the tip plate can be varied thereby allowing for additional control of the environment by aiding in the control of the tip plate heat pattern.

DESCRIPTION OF THE PRIOR ART

It is known generally in the art to attempt to control the environment in the attenuation zone of a bushing assembly in a glass fiber forming device. Exemplary of this prior art is the following U.S. Pat. Nos. 3,969,099 to Reese; 4,018,586 to Cates, Jr., et al; 4,049,411 to Long et al; 4,049,415 to Dent, Jr.; and 4,088,469 to Schaefer. These patents are assigned to the assignee of the present patent application and, as indicated above, are examples of various prior art devices whose purpose is to effect the environment adjacent the tip plate of a glass fiber forming bushing.

In the production of glass fiber filaments, it is well known to flow molten glass from a suitable source into a bushing assembly. This bushing is generally an elongated channel having side and end walls and a generally planar bottom which carries a large number of nozzles or tips through which the molten glass passes. In the zone immediately below these tips, the molten glass is formed into filaments, which normally then have a sizing applied to them and are gathered into a strand, and wound onto a package. The environment in the zone directly below the tip plate is crucial in the formation of the filaments because it is in this area that the molten glass cools and changes into the filaments. Temperature fluctuations in this zone will result in diameter variations in the strands. Furthermore, stray air currents can carry unwanted materials into the zone thereby breaking the filaments and decreasing production efficiency.

The bushing tip plate is usually electrically heated and suitable control means are provided to maintain a uniform tip plate heat pattern. This is not always successful so that variations in tip plate temperature patterns, which cause differing filament sizes, can result. A fin cooler assembly is frequently provided under the tip plate to aid in the cooling of the filaments and to assist in keeping the tip plate at a desired temperature. However, the tip plate may still be non-uniform, thus requiring additional means to effect control of the tip plate heat pattern.

If the environment in the zone immediately under the bushing tip plate is not properly controlled, the filaments formed by the bushing will, as indicated previously, have a range of diameters which may be unacceptable. Filaments subjected to more rapid cooling in one portion of the zone than in another portion of the zone will have larger diameters and may not withstand the gathering and winding forces applied to them causing breakage of the filament. Conversely, filaments which are undercooled may break due to instability.

While the desirability of bushing environment control is well recognized and although prior art devices are directed to this control, there is a need for more effective control of the environment in the zone directly beneath the tip plate. As forming speeds increase and as filament diameters decrease, the need for effective bushing environment control becomes increasingly necessary.

SUMMARY OF THE INVENTION

It is an object of the present invention to provide a bushing environment control assembly.

Another object of the present invention is to provide a bushing environment control assembly which uses flow of coolant gas.

A further object of the present invention is to provide a bushing environment control assembly having a fin cooler with adjustable fin plates.

Still another object of the present invention is to provide a bushing environment control assembly in which the coolant gas is supplied in a nonturbulent manner.

Yet a further object of the present invention is to provide a bushing environment control assembly providing a screening curtain of gas flow.

As will be set forth in greater detail in the description of a preferred embodiment, the bushing environment control assembly, in accordance with the present invention, is comprised generally of a fin cooler assembly having coolant gas flow means. The fin cooler assembly includes a plurality of fin plates which extend from a housing outwardly between the rows of forming tips of the bushings. Coolant gas, such as air, is supplied under pressure to a plenum chamber in the fin cooler housing. The gas passes through a diffuser means and then into the zone directly beneath the tip plate. A secondary stream of gas is directed downwardly parallel to the direction of filament travel to shield the filaments. The fin plates are pivotally carried in the fin cooler housing and can be adjusted to vary their position with respect to the tip plate as a means for aiding in the control of the heat pattern of the tip plate.

The fin cooler assembly is secured beneath the bushing tip plate in a generally known manner. The plenum chamber is formed as a portion of the fin cooler and the coolant gas supplied thereto passes through the diffusion screening to enter the zone directly beneath the tip plate in a controllable manner. Since this coolant gas flow is uniform across the tip plate area, the filaments are uniformly cooled so that filament diameter is more uniform. The volume of coolant gas and its pressure is readily regulatable as may be necessary to properly control the bushing environment. If the bushing is to be operated at a different filament speed or if the bushing itself is changed, the coolant flow can be correspondingly adjusted.

The secondary coolant gas flow in a downward direction acts as a screen which prevents intrusion of extraneous materials into the fan of filaments being attenuated. This sheet of air also provides a small air drawing effect so that the air flow adjacent the nozzles is constant with respect to time.

In the operation of a glass fiber forming bushing, it is important that the operator be able to observe the tips of the bushing assembly. Such observation is necessary to allow the operator to see any broken filaments or tips where globs of glass are forming. This visual observation cannot be compromised by the addition of ancillary devices. Since the bushing environment control assembly of the present invention is formed as part of the fin cooler housing, it does not obstruct the operator's view. The assembly can be implemented into existing production facilities and will perform its desired environment control functions without interfering with the operator's access to the bushing.

By use of the bushing environment control assembly, in accordance with the present invention, the glass fiber filament forming properties of the bushing are enhanced, the filaments are formed in a more uniform manner, and the region around the filament fan is maintained with less extraneous debris. Furthermore, the operator's access to the tip plate is not compromised and the system can be used with existing production facilities.

BRIEF DESCRIPTION OF THE DRAWINGS

While the novel features of the bushing environment control system, in accordance with the present invention, are set forth with particularity in the appended claims, a full and complete understanding of the invention may be had by referring to the detailed description of a preferred embodiment as set forth hereinafter and as may be seen in the accompanying drawings in which:

FIG. 1 is a side elevation view, partly in section, of a bushing environment control assembly in accordance with the present invention;

FIG. 2 is a cross-sectional view of a portion of the bushing embodiment control assembly of the present invention taken along line 2—2 of FIG. 1.

DESCRIPTION OF A PREFERRED EMBODIMENT

Figure 3:
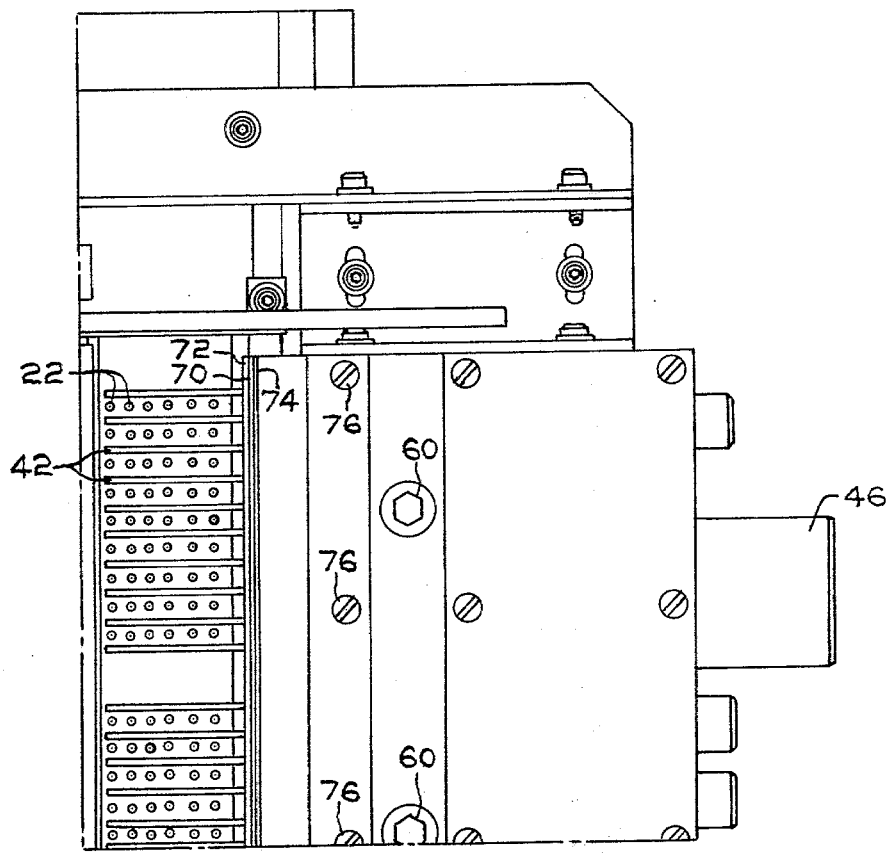
FIG. 3 is a bottom plan view of a portion of the bushing environment control assembly of the present invention.

Turning initially to FIG. 1, there may be seen generally at 10 a preferred embodiment of a bushing environment control assembly, in accordance with the present invention. Bushing environment control assembly 10 is comprised generally of a fin cooler assembly 12 which is secured beneath a generally conventional glass fiber forming bushing 14. As may be seen in FIG. 1, bushing 14 is a generally well known assembly which is comprised of sloping side walls 16, an open top 18 through which molten glass flows from a forehearth or other similar source, and a tip plate 20 which forms the bottom of bushing 14. Tip plate 20 carries a large number of glass fiber forming nozzles or tips 22, as may be seen in FIGS. 1 and 2, through which the molten glass flows. This molten glass is attenuated into filaments and is gathered, sized, and wound into suitable packages in a known manner by conventional means, not shown.

Tip plate 20 of bushing 14 includes a corrugation 24 which extends across tip plate. This corrugation carries, as is shown in FIG. 1, a castable refractory material 26. An ovoid shaped water or other liquid coolant line 28 is in contact with the refractory 26 and helps to support the tip plate 20 so that it will not deform as readily at operating temperature. The coolant flow in line 28 also aids in controlling the temperature pattern of the tip plate 20. This line 28 is secured in a known manner and is generally known in the art.

Bushing 14 is carried in a suitable insulating refractory 30, which, in turn, is contained by conventional bushing frame 32 that is secured by clamps 34 to the forehearth. Suitable means are provided (not shown) to supply electric current to the bushing tip plate 20 to maintain its operating temperature and a liquid coolant line 36 is provided in the bushing refractory 30 adjacent the bushing's connection to the forehearth.

Turning again to FIG. 1, fin cooler assembly 12 is secured beneath bushing 14 in any known manner, for example, by use of a plurality of threaded bolts 40 which engage the bushing frame 32. Fin cooler assembly 12 has a plurality of fin plates 42 which extend between rows of tips 22 beneath the tip plate 20, as may be seen more clearly in FIGS. 2 and 3. Fin coolers are known in the art (U.S. Pat. No. 2,908,036) and provide a cooling function for removing heat from the tip plate 20, the tips 22, and the glass fiber filaments formed by the tips. In the present invention, the fin cooler assembly 12 additionally provides the bushing environment control feature.

As may be seen most clearly in the left portion of FIG. 1, the fin cooler assembly 12 includes a plenum chamber 44 into which a coolant gas such as air is fed under pressure and at a suitable flow rate. The coolant gas enters plenum chamber 44 through inlet 46. Plenum chamber 44 extends along the width of fin cooler assembly 12 and may be provided with a plurality of coolant gas inlets 46 as required to prevent turbulent flow of the gas into the chamber. The gas then flows out into the attenuating zone directly beneath the tips 22 through the spaces between the spaced fin plates 42. The air is diffused before it passes between the fin plates 42 first by a generally semi-cylindrical perforated screen 48 and then by a fine diffusion screen 50 which is generally accordian shaped and is carried within the shape defined by the perforated screen 48. Perforated screen 48 and fine diffusion screen 50 reduce turbulence in the coolant gas and also act as filters to prevent any particulate matter from coming into contact with the glass fiber filaments being formed. These screens generally surround first ends of the fin plates 42 which protrude into plenum chamber 44. A suitable spring steel seal strip 52 overlays the periphery of each fin plate 42 and seals the space where each of the fin plates 42 passes out of the plenum chamber 44 into the zone beneath the tip plate 20. This is to prevent any coolant gas leakage above or below the fin plates 42 and to insure that all the coolant gas flow is between the fin plates 42.

The fin plates 42 are pivotally adjustable to change slightly the distance between the tip of the fin plates 42 and the tip plate 20. As may be seen in FIG. 1, a liquid coolant line 54 passes through the plenum chamber 44 and through a suitable aperture 56 in the portion of each fin plate in the plenum chamber. Such a liquid coolant line is generally known in the art and serves to take heat away from the fin plates. The coolant line 54 passes through a slot (not shown) in the screens 48 and 50. A fin adjusting sleeve 58 is affixed to the coolant line 54 externally of the perforated screen 48. Sleeve 58 is internally threaded and receives a fin adjusting bolt 60 which passes upwardly through a bottom portion 62 of plenum chamber 44. Since the fin plates 42 are rigidly affixed to the coolant line 54 as is the adjusting sleeve 58, rotation of bolt 60 will cause sleeve 58 to move either upwardly or downwardly to cause a slight pivotal movement of the fin plates 42. While this movement is rather slight, it will affect the heat pattern of the tip plate by altering the spacing between the fin plates 42 and the tip plate.

As discussed above, the primary flow of coolant gas is through the perforated screen 48 and the fine diffuser screen 50 between the fin plates 42 into the zone immediately below the tip plate. This flow is generally perpendicular to the direction of travel of the filaments being attenuated. A secondary flow of coolant gas is also provided by the bushing environment control system and this secondary flow of coolant gas is generally parallel to the fan of filaments. As may be seen in FIGS. 1 and 3, a secondary coolant gas flow slot 70 is formed by a downwardly extending wall 72 of the plenum chamber 44 and a cooperating adjustable deflector 74. Deflector 74 is adjustably secured to the bottom 62 of the plenum chamber 44 by a plurality of adjusting screws 76. Deflector 74 can be moved toward or away from the downwardly extending wall 72 of the plenum chamber 44 to vary the width of the secondary gas coolant flow slot 70. The coolant gas which flows through slot 70 flows downwardly parallel to the fan of filaments to eliminate transient flow in the filament array below the tips 22.

Control of the environment in the zone immediately below the tip plates is quite important to proper filament forming. In the preferred embodiment, the molten glass in the bushing is at a temperature of approximately 2200° F. and is effectively at rest. Tip diameters are normally in the range of 0.04 to 0.1 inch and the filament produced by a given tip has a diameter of approximately 1/200th of that of the tip, for example, a tip having a diameter of 0.06 inch would produce a filament having a diameter of about 0.00025 inch. The filament may be attenuated from the tip at a speed of approximately 15000 to 18000 feet per minute. The temperature of the filament immediately after passing through the tip is reduced to approximately 1000° F. Thus, molten glass at 2200° F. and zero velocity is cooled to 1000° F. and raised in velocity to as much as 18000 feet per minute in the space of only several inches. If the bushing environment is not closely controlled, various transient air flows and the like can seriously adversely affect the bushing production.

In operation, the bushing 14 is supplied with molten glass which passes through the tips 22. The fin plates 42 are properly positioned by use of the fin adjusting bolt 60 and liquid coolant is passed through line 54 at a desired flow rate to extract heat from the fin plates 42. A coolant gas such as air is introduced into plenum chamber 44, passes through diffuser screens 48 and 50 and flows in a non-turbulent manner between the fin plates 42 into the attenuating zone and immediately beneath the tip plate 20. This coolant gas flow controls the bushing environment in the attenuating zone so that the filaments are attenuated in a uniform environment. Secondary gas flows through slot 70 to shield the filament fan from extraneous air currents and the like to further control the bushing environment away from the tip plate 20 thus further aiding in the production of uniform filaments at high speeds with reduced filament breakage.

It will be understood that the bushing environment control system shown in the left of FIG. 1 has a similar couterpart on the right side of FIG. 1. Since the fin plates 42 are pivotably carried in the plenum chamber, they do not extend completely across the tip plate 20. While only the left set of fin plates 42 is shown in FIG. 1, it will be understood that corresponding ones extend from a plenum chamber at the right of the bushing out to the center of the tip plate 20.

While a preferred embodiment of a bushing environment control system, in accordance with the present invention, has been fully and completely described hereinabove, it will be obvious to one of ordinary skill that a number of changes in, for example, the shape of the bushing and tip plate, the number of tips, the number of fin plates, the securing means for the bushing and fin cooler and the like could be made without departing from the true spirit and scope of the invention and that accordingly the invention is to be limited only by the following claims:

I claim:

1. A bushing environment control assembly for controlling the environment in the attenuation zone of a glass fiber filament forming bushing, said bushing environment control assembly comprising:

a fin cooler assembly secured beneath said bushing in the direction of travel of the filaments being formed, said fin cooler assembly having a plurality of spaced fin plates extending into the attenuation zone;

a plenum chamber adjacent said attenuation zone, said fin plates having first ends positioned in said plenum chamber;

means for supplying a coolant gas to said plenum chamber;

means for allowing flow of a first portion of said coolant gas into said attenuation zone; and means for allowing flow of a second portion of said coolant gas in the direction of travel of the filaments being formed.

2. The bushing environment control assembly of claim 1 wherein said coolant gas is air.

3. The bushing environment control assembly of claim 1 wherein diffuser screen means are provided in said plenum chamber.

4. The bushing environment control assembly of claim 3 wherein said diffuser screen means is adjacent said first ends of said fin plates.

5. The bushing environment control assembly of claim 1 wherein said first portion of said coolant gas flows between said spaced fin plates into said attenuation zone.

6. The bushing environment control assembly of claim 1 wherein said fin plates are secured at their first ends to a liquid coolant line.

7. The bushing environment control assembly of claim 6 wherein said liquid coolant line is secured to a fin adjusting sleeve, movement of said fin adjusting sleeve causing pivotal movement of said fin plates.

8. The bushing environment control assembly of claim 1 wherein said flow of said second portion of said coolant gas is through a gas flow slot.

9. The bushing environment control assembly of claim 8 wherein the width of said gas flow slot is adjustable.

* * * * *